United States Patent
Wheeler et al.

(10) Patent No.: US 6,981,460 B1
(45) Date of Patent: Jan. 3, 2006

(54) SELF-GENERATING AIR CUSHION VESSEL

(76) Inventors: Robert L Wheeler, 823-A E. Gulf Blvd., Indian Rocks Beach, FL (US) 33785; Walter Crowley, 861 Shorecrest Dr., Oak Harbor, WA (US) 98277

( * ) Notice: Subject to any disclaimer, the term of this patent is extended or adjusted under 35 U.S.C. 154(b) by 0 days.

(21) Appl. No.: 10/707,590

(22) Filed: Dec. 23, 2003

(51) Int. Cl.
  *B63B 1/34* (2006.01)
(52) U.S. Cl. .................. 114/67 A; 114/288
(58) Field of Classification Search ........... 114/62, 114/67 A, 288; 180/126, 129
  See application file for complete search history.

(56) References Cited

U.S. PATENT DOCUMENTS

| | | | |
|---|---|---|---|
| 2,488,183 A * | 11/1949 | Garmont ................ 114/62 |
| 3,342,032 A * | 9/1967 | Cox et al. ............... 60/221 |
| 3,518,956 A | 7/1970 | Girodin |
| 3,688,724 A | 9/1972 | Bertin |
| 3,742,888 A | 7/1973 | Crowley |
| 4,133,282 A * | 1/1979 | Cockerell ............. 114/67 A |
| 5,146,863 A * | 9/1992 | Ford .................... 114/67 A |
| 6,453,837 B1 * | 9/2002 | Arbaugh et al. .......... 114/219 |
| 6,672,234 B2 * | 1/2004 | Osmundsvaag ........... 114/67 A |

FOREIGN PATENT DOCUMENTS

| JP | 52-11594 | * | 1/1977 | ......... 114/67 A |
| JP | 62-120292 | * | 6/1987 | ......... 114/67 A |

* cited by examiner

*Primary Examiner*—Andrew D. Wright
(74) *Attorney, Agent, or Firm*—Smith & Hopen, P.A.; Ronald E. Smith

(57) ABSTRACT

A rigid concavity is formed in the underside of a hull of a water craft. Air enters into the concavity when the water craft is moving forward. Supplemental air is introduced into the concavity by an air scoop mounted to the bow. A one-way valve in an air passageway between the air scoop and the concavity prevents air from flowing from the concavity to the air scoop. A first stern plate mounted at a slight downward angle causes air to flow under the stern in the form of small bubbles and increases the back pressure presented to the flow of water and air through the concavity. A pair of adjustably mounted stern plates may also be provided on opposite sides of the motor to control the amount of back pressure. The airflow through the rigid concavity reduces drag so that the water craft can travel at higher speeds.

8 Claims, 8 Drawing Sheets

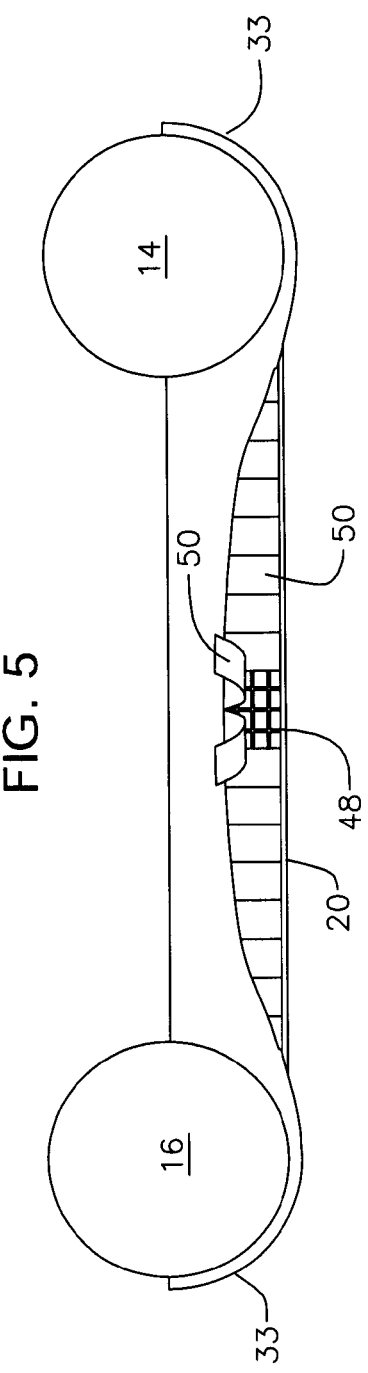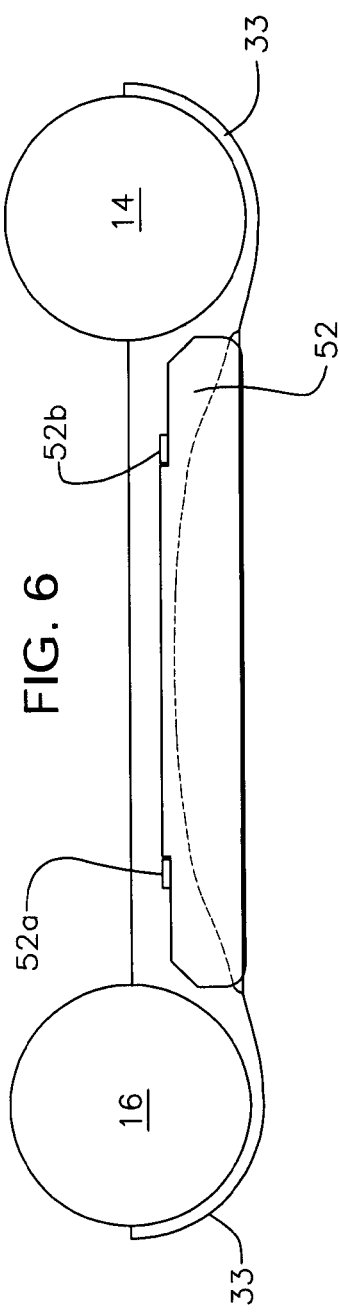

SELF-GENERATING AIR CUSHION VESSEL

BACKGROUND OF INVENTION

1. Field of the Invention

This invention relates, generally, to water craft. More particularly, it relates to a water craft design that incorporates a rigid concavity in the hull to reduce drag.

2. Description of the Prior Art

An inflatable dinghy is a small boat used to transport passengers from a larger boat to shore and back again. They have utility whenever the draft of the larger boat exceeds the depth of the water adjacent a wharf, pier, or shore.

A dinghy is made by a pair of generally parallel, elongate air-filled tubes that are interconnected at their respective forward ends by a transversely disposed air-filled tube that forms a bow. The parallel tubes form the sidewalls of the craft. A rigid transom to which a small outboard motor is secured interconnects the respective trailing ends of the sidewalls to one another. The deck of the dinghy is a piece of plastic or other suitable flat material that is connected about its periphery to the underside of the bow and the sidewalls. The deck is usually reinforced by a plurality of transversely disposed braces.

The floorboard of a dinghy overlies the deck and is formed of a rigid material such as plywood, aluminum, or the like. The floorboard may also be formed of an inflatable material.

A convex hull is positioned below the deck, and a longitudinally disposed rib is typically provided as a part of the hull to maintain the convex shape of the hull.

The outboard motor typically used with a dinghy has about five (5) horsepower and the top speed of a dinghy is usually about eight (8) knots.

A dinghy cannot be made to travel significantly faster by increasing the horsepower of its motor or the thrust provided by its propeller. Due to its flexible construction, the deck begins to fold along transversely disposed lines if more power is applied to its stern. In other words, a dinghy shortens in the direction of travel if it is thrust forward with enhanced power. The folded bottom wall greatly increases the resistance to forward travel.

There are times when the distance from an anchored boat to shore is quite long. Thus, the trip in the dinghy can consume substantial amounts of time. It would be beneficial, then, if a dinghy could be modified so that it could travel at a much faster rate than the current eight (8) knots.

There are many other types of small craft, such as dinghies that are made of rigid, non-inflated materials, RIBs (rigid inflatable boats), motorboats, single-hulled sailboats, catamarans, trimarans, rowboats, canoes, and so on. The realm of small craft could also be expanded to include floatable items such as surfboards and windsurfing boards.

Accordingly, if a way could be found to improve the performance of a typical inflated dinghy, then the same technology could be applied to all other small craft.

The same technology could be applied to large craft as well.

Moreover, any technology employed for the purpose of enabling a water craft to attain higher speed when under its own power also has the beneficial side effect of reducing drag when a small craft is towed by a larger craft.

Since reduction of drag translates into increase of speed, a means for reducing the drag in a water craft is desirable.

Earlier inventions in this field of technology are disclosed in U.S. Pat. No. 3,742,888 to co-inventor Crowley, as well as in U.S. Pat. Nos. 3,688,724, 3,518,956, and Great Britain patent No. 1,001,059.

However, in view of the prior art considered as a whole at the time the present invention was made, it was not obvious to those of ordinary skill in the pertinent art how the known water crafts could be modified to further reduce drag and increase speed.

SUMMARY OF INVENTION

The long-standing but heretofore unfulfilled need for a water craft having reduced drag so that it is capable of relatively high speed travel when under its own power and requiring reduced power to tow it is now met by a new, useful, and nonobvious invention.

The novel small craft of the first illustrative embodiment includes a bow, a stern, a deck and a hull. A rigid concavity having a longitudinal extent that exceeds a transverse extent thereof is formed in the hull.

More particularly, the rigid concavity has a forward end near the bow and a rearward end forwardly of the stern so that air flows into the rigid concavity at the forward end and so that air flows out of the rigid concavity at the rearward end. The air flowing out of the rearward end of the concavity flows under the stern as the small craft undergoes forward travel. Again, it should be understood that the same phenomenon occurs where the water craft is large as well.

Air in the rigid concavity reduces the drag of the water craft, thereby enabling the water craft to travel faster under its own power and reducing the power required to drag a small craft behind a larger craft.

The drag is reduced by reducing the wetted surface area of the hull and replacing water with low-density air, it being understood that low density air produces less drag than water. However, unlike some earlier designs, the air in the rigid concavity does not form a relatively static bubble beneath the boat that expands and contracts in size as waves form troughs and crests, respectively, but instead enters into and exits the concavity at substantially the speed at which the water craft is traveling.

The novel water craft will first be summarized in greater detail while making reference to a dinghy construction, although it will become apparent that the technology is applicable to any other type of water craft as well. Thus, the technology disclosed hereinafter applies to boats or vessels of any size, whether made of inflated fabric, rigid aluminum, fiberglass, wood, steel, or other boat-building materials.

The technology may also be applied to the landing gear or pontoons of a water-landing and take-off aircraft. As will become clear as this disclosure proceeds, the reduced drag made possible by the novel structure reduces the amount of fuel required to take-off from a body of water and increases the safety of a water landing by reducing the abruptness of the braking action of the water.

When applied to a boat or vessel of any size, the technology disclosed herein reduces fuel consumption, provides increased stability, enhances safety, and suppresses the wake of the boat or vessel, thereby reducing complaints from owners of shoreline property.

A typical inflatable dinghy is formed of three inflated tubes, two of which are parallel to one another and form the sidewalls of the water craft and a third of which interconnects the two parallel tubes at their respective front ends.

A transversely disposed transom is disposed in interconnecting relation to the respective trailing ends of the parallel sidewalls to form a stern.

The dinghy has a bottom wall or deck formed of a sheet material. The sheet material, which may be a plastic or other suitable material, has peripheral edges secured to a bottom side of the sidewalls and the bow. A plurality of rigid, transversely disposed support braces typically reinforce the deck.

A convex hull depends from the peripheral edges of the deck and the hull is maintained in said convex configuration by an inflated longitudinally disposed rib.

To convert a typical dinghy such as the one just described into a small craft having a self-generating air cushion that reduces drag, a rigid concavity is formed in the hull by inverting the dinghy to form a concavity in the hull and by applying fiberglass in overlying relation to the concavity so that the concavity is rigid when the fiberglass cures.

The rigid concavity extends from just rearwardly of the bow to nearly the stern of the small craft. The width of the rigid concavity is about equal to the width of the deck. Determining the optimal length, width, depth, and shape of the rigid concavity for each small craft would require empirical studies or rigorous mathematics. However, such optimization is not required to substantially obtain the benefits of reduced drag afforded by the novel construction.

As a side benefit of the invention, the rigid floorboards commonly used in dinghies are not required in a dinghy having the rigid concavity of this invention. The rigidity of the concavity provides the needed support for the deck. In this way, it may be said that the novel structure provides an exterior floorboard whereas prior art floorboards are in the interior of the water craft.

A lower surface of the parallel sidewalls and bow may also be covered with fiberglass that is formed integrally with the fiberglass that forms the rigid concavity.

A layer of flexible sheet material is disposed between the fiberglass and the bottom wall of the dinghy and the underside of the bow and sidewalls. The layer of flexible sheet material provides a substrate for the fiberglass.

When the water craft is under way, air enters into the rigid concavity. Since air density is about one-eight hundredth ($\frac{1}{800}$th) the density of water, the drag developed by the water craft is substantially reduced.

Significantly, the reduction in drag is beneficial when the water craft is under tow as well. In some cases, the water craft could ride in the wake of a larger, towing craft and the drag could be reduced to a very low value.

Thus it is understood that the primary reduction in drag is achieved by the rigid concavity formed in the hull of the water craft.

At speeds above a certain threshold, such as fifteen (15) knots, the drag may be further reduced by the provision of an air scoop mounted to the bow.

In a preferred embodiment, the air scoop is also made of fiberglass formed integrally with the fiberglass that covers the rigid concavity and the underside of the parallel tubes and the bow. The air scoop is adapted to collect air when the dinghy is undergoing forward travel and to direct air into the rigid concavity. The air scoop has a generally elliptical shape such that a transverse extent thereof is greater than a height extent thereof.

When the water craft is undergoing forward travel, air enters into the air scoop and is directed into the rigid concavity. Air entering into the rigid concavity reduces the drag against forward travel as aforesaid. Air in the rigid concavity escapes the rigid concavity by flowing under the stern so that an air flow is established into and out of the rigid concavity as the water craft undergoes forward travel.

A stern plate is positioned rearwardly of the rigid concavity and is tilted at a slight angle relative to horizontal with its leading edge a little higher than its trailing edge. Air exiting the rigid concavity thus is constrained to flow under the stern plate. This raises the stern of the water craft slightly and further reduces drag.

An airflow passageway extends from a leading end of the air scoop into the rigid concavity. In this embodiment, the airflow passageway has a gradual reduction of volume as it approaches the rigid concavity. However, in other embodiments of this invention now under construction, the reduction in volume may be eliminated.

Air pressure in the rigid concavity is lower than atmospheric air pressure so that air is drawn or rammed into the air scoop when the water craft is undergoing forward motion (whether under its own propulsion or due to towing).

A one-way valve is mounted in the airflow passageway to enable ram airflow into the rigid concavity when the water craft is in forward motion and to prevent reverse direction air flow so that ram air flowing in the airflow passageway toward the rigid concavity cannot flow in an opposite direction.

Thus, air in the rigid concavity does not flow toward the air scoop when the bow of the water craft is momentarily lifted from the water when the water craft is traveling in choppy waters.

The one-way valve may be provided in many forms, all of which are within the scope of this invention.

In a preferred embodiment, a vertically and transversely disposed wire mesh is positioned in the airflow passageway. A top edge of the wire mesh is disposed in abutting relation to a top surface of the airflow passageway and a bottom edge of the wire mesh is disposed in abutting relation to a bottom surface of the airflow passageway. The wire mesh has side edges that interconnect the top and bottom edges and which are disposed in abutting relation to opposed sidewalls of the airflow passageway.

A plurality of flexible flaps depends from the top edge of the wire mesh. The flexible flaps are lifted from the wire mesh when ram air flows through the airflow passageway in a direction from the air scoop toward the rigid concavity and the flexible flaps are pressed against the wire mesh to collectively form a wall impervious to air when air attempts to flow from the rigid concavity toward the air scoop.

The flexible flaps in conjunction with the wire mesh form the one-way valve.

In a second embodiment of the one-way valve, an impervious-to-air gate is hingedly mounted to an upper wall of the air passageway. The gate swings open about its hinges when ram air flows from the air scoop to the concavity. The gate closes under its own weight when air attempts to flow from the concavity toward the air scoop.

An elongate, longitudinally disposed rib is secured to an underside of each of the fiberglass-covered sidewalls in depending relation thereto. The elongate ribs inhibit transverse motion of the stern, also known as "fishtailing," when the dinghy is in forward motion.

Water is splashed into the rigid concavity in the form of a spray by a plurality of "V"-shaped notches formed in the trailing end of the air scoop, i.e., where the ram air passageway ends and the rigid concavity begins. Water in the from of a spray helps propel air out of the rigid concavity.

Water going over a waterfall, flowing rapidly over rocks in a stream, coming out of a showerhead, or flowing from a hose held slightly above the surface of a body of water has a white-in-color appearance due to air entrained into the water flow. The same white water is seen in the rigid concavity due to the "V"-shaped notches. The water impinging against the notches is thrown upwardly into the concavity, forming a white spray that helps move air through the concavity. Such a white spray, caused by entrained air, does not appear in prior art water craft having a concavity or plural concavities formed in a hull. Due to the rapid flow of white water through the concavity of this invention, changes in air pressure within the concavity that may appear as waves rise and fall below the boat do not substantially affect its performance.

The spray of white water may be caused by any other suitable means without limitation to the "V"-shaped notches.

A pair of adjustable stern plates is provided on opposite sides of the motor at the stern end of the water craft. The adjustable stern plates are angled at a slight angle relative to horizontal for light loads and are angled at increasingly greater angles for increasingly heavier loads.

The stern plates increase the back pressure applied to water and air flowing through the concavity. Thus, when the stern plates are not angled downwardly, they do not increase the back pressure. A small angular downturn slightly increases the back pressure, a greater angular downturn increase the back pressure, and so on. Thus, where a heavy load requires increased buoyancy, the stern plates may be angled downwardly at a steep angle to increase the back pressure to thereby slow down the flow of air and white water through the rigid concavity, thereby enhancing the buoyancy of the water craft.

In yet another embodiment, an increasing number of stern plates may be attached to the stern end of a water craft to match an increasing load or to provide increased back pressure for whatever reason. The respective leading ends of the stern plates collectively form an arcuate wall defining the trailing end of the rigid concavity so that air exiting the rigid concavity is constrained to flow under the stern plates.

An important object of this invention is to provide a water craft that travels substantially faster than a conventional water craft when the power inputs are equal.

A more specific object is to provide a water craft that travels faster than conventional water craft due to a reduced drag design.

Another object is to provide a water craft having reduced drag so that is easier to tow than a conventional water craft.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which:

FIG. 5 is a sectional view taken along line 5—5 in FIG. 4;

FIG. 6 is a sectional view like that of FIG. 5 but depicting an alternative embodiment of the parts depicted in said FIG. 5;

DETAILED DESCRIPTION

Figure 1:
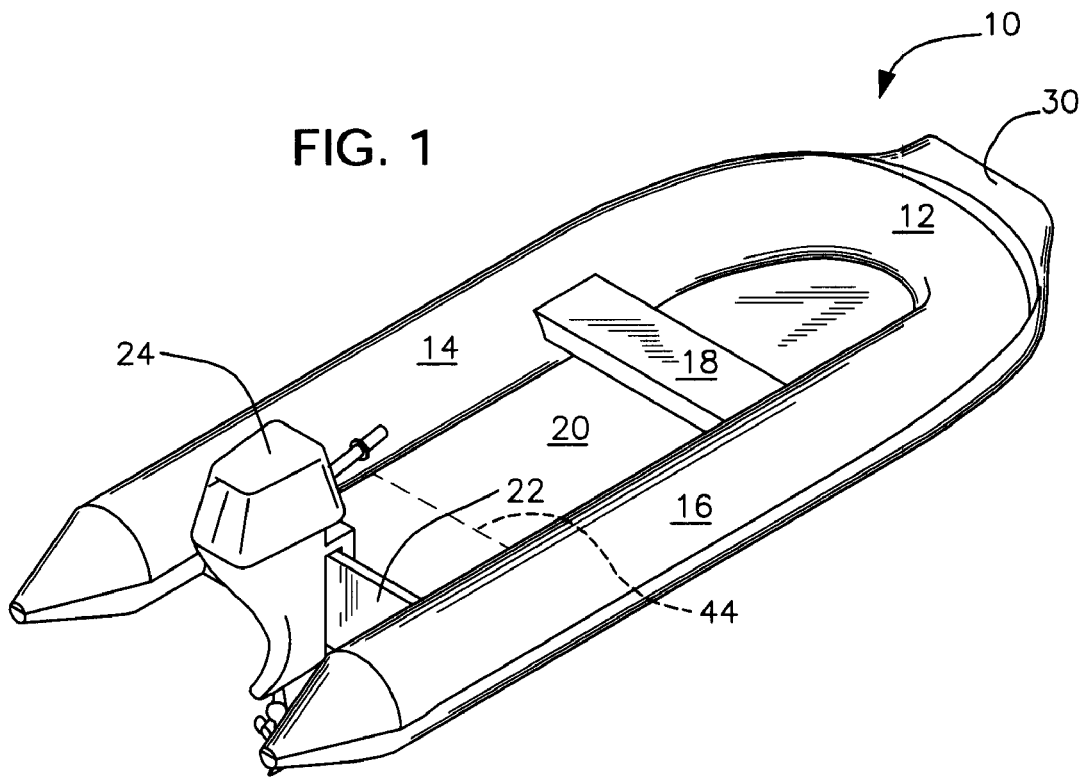
FIG. 1 is a rear perspective view of the novel dinghy.
Figure 2:
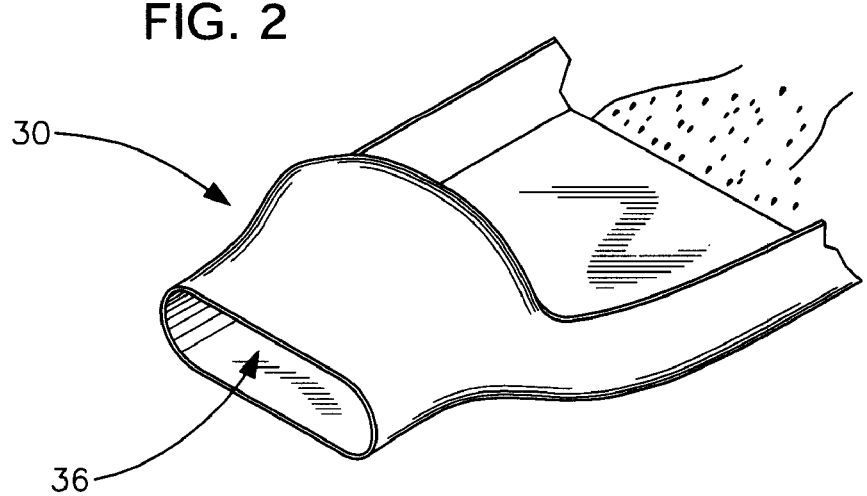
FIG. 2 is a front perspective view of the air scoop that attaches to the bow of the novel dinghy.

Referring now to FIGS. 1 and 2, it will there be seen that the reference numeral 10 denotes a first embodiment of the novel dinghy as a whole. The invention will be described by making reference to a dinghy for convenience purposes, but the teachings and suggestions of this disclosure are also applicable to other small craft such as yachts, RIBs (rigid inflatable boats), rowboats, motorboats, surfboards, windsurfing boards, and the like. The teachings and suggestions of this invention are equally applicable to large craft.

Dinghy 10 includes bow 12, first side wall 14, second side wall 16, rigid seat 18 supported at its opposite ends by said first and second side walls, deck 20, and rigid transom 22 upon which is mounted motor 24.

Figure 3:
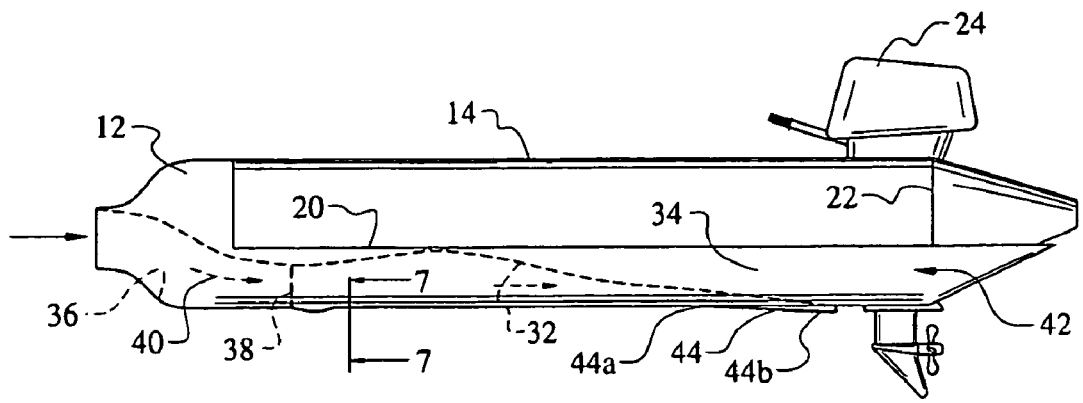
FIG. 3 is a side elevational view of the novel dinghy.

Air intake scoop 30 is formed integrally with bow 12. Air intake scoop 30 has a generally elliptical configuration so that its transverse extent exceeds its height extent. FIG. 3 depicts concavity 32 formed in hull 34 of dinghy 10.

The width of air intake scoop 30 is about the same as the width of rigid concavity 32, thereby ensuring that the volume of air entering into said rigid concavity per unit of time is a large volume.

Figure 7:
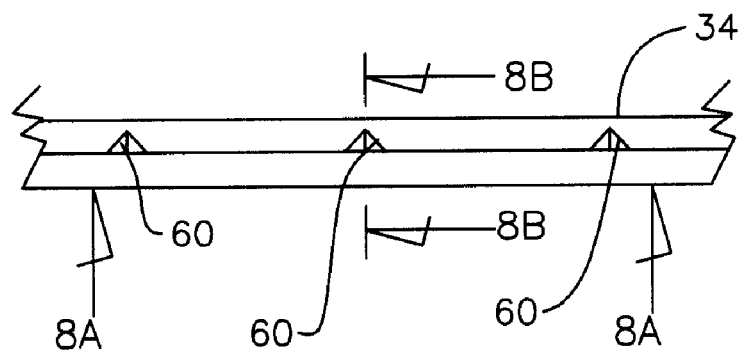
FIG. 7 is a sectional view taken along line 7—7 in FIG. 3.
Figure 8A:
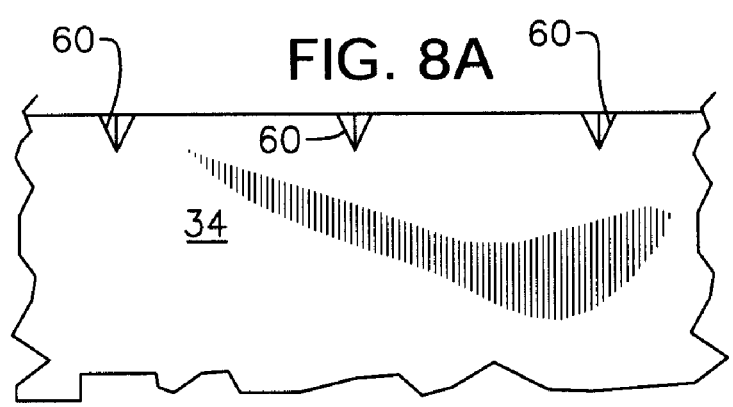
FIG. 8A is a sectional view taken along line 8A—8A in FIG. 7.
Figure 8B:
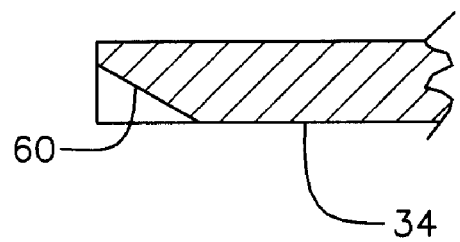
FIG. 8B is a sectional view taken along line 8B—8B in FIG. 7.

Dinghy 10 is inverted to form concavity 32, said flexible hull sagging when inverted and therefore forming such concave configuration. A sheet of thin flexible material, preferably Visqueen®plastic, not shown to simplify the drawing, is positioned in overlying relation to concavity 32 and in overlying relation to the respective undersides of bow 12 and sidewalls 14, 16 as well. A thin layer of fiberglass 33 (FIGS. 7 and 8) is applied to the Visqueen® plastic in a well-known way. The fiberglass imparts rigidity to the concavity and to all of said underside surfaces as well.

Instead of fiberglass, the undersurfaces of the water craft may be covered with wood or other suitable rigid material.

It should be understood that air scoop 30 is not required to provide the reduced drag effects offered by rigid concavity 32. At relatively slow speeds, sufficient air enters into rigid concavity to provide the drag reduction needed. At higher speeds, supplemental air from air scoop 30 becomes beneficial at maintaining the air in rigid concavity 32.

In FIG. 3, dinghy 10 having rigid concavity 32 formed in hull 34 is depicted in its upright, operable position. Deck 20 remains flat and thus its shape is unaffected by the rigid concavity formed in the hull. The rigidity of the concavity, however, eliminates any need for a rigid floorboard of the type usually employed in dinghies.

Air scoop 30 includes an airflow passageway, denoted 36 generally, that extends from the leading edge of air scoop 30 to the leading end of rigid concavity 32. In this particular embodiment, airflow passageway 36 gradually reduces in volume as it approaches rigid concavity 32 although such a reduction in volume is not believed to be required. A relatively narrow constriction 38 is therefore formed where airflow passageway 36 meets rigid concavity 32.

The volume of rigid concavity 32 is greater then the volume of constriction 38. Thus, the air pressure within rigid concavity 32 is less than atmospheric pressure, thereby drawing ambient air into air scoop 30 as dinghy 10 travels forwardly.

The stern of dinghy 10 is denoted 42, generally, in FIG. 3. Note that concavity 32 does not extend all the way to said stern. Thus, white water and air exiting concavity 32 must flow under stern 42. It should be noted that the stern end of the concavity has the same width as the bow end, thereby ensuring that the volume of air entering into the concavity through air scoop 30 is not restricted.

Directional arrows collectively denoted 40 indicate the path of travel followed by air flowing through air passageway 36, rigid concavity 32, and under stern 42. Air flowing under the stern does so in the form of bubbles, thereby reducing the drag of the stern by lubricating it, so to speak.

To increase the back pressure as air exits the trailing end of rigid concavity 32 and flows under stern 42, a transversely disposed stern plate 44 is mounted to the bottom of hull 34 at a slight angle as perhaps best understood in connection with FIG. 3. Stern plate 44 is positioned just forwardly of transom 22 as best understood in connection with FIG. 4. The angle of tilt relative to a horizontal plane is just one or two degrees (1–2°). With the leading edge 44a of stern plate 44 being slightly higher than trailing edge 44b thereof, air flowing towards stern 42 impacts against the slightly upwardly angled flat bottom of stern plate 44 and such impact serves to lift the stern plate from the water, thereby further reducing the drag produced by dinghy 10 as it travels forwardly in water. A large number of small bubbles is created by the impact because water flowing under said stern plate 44 is commingled with the air exiting rigid concavity 32.

It should be observed that the downward angle of the stern plate increases the back pressure presented to the air exiting the cavity by at least some extent. In the absence of such a stern plate, or if the stern plate were mounted level, i.e., at no angle relative to the horizontal, it would not affect back pressure.

The effect of air flowing through rigid concavity 32 is to reduce drag because the above water surfaces of concavity 32 are contacted primarily by air flowing therepast, not primarily by water. This enables the dinghy to reach speeds in excess of twenty two miles per hour when powered by a fifteen (15) horsepower outboard motor. Fiberglass 33 or other suitable rigid material on the underside of the dinghy prevents it from folding in the direction of travel.

Stern 42 of dinghy 10 may oscillate laterally to some extent when dinghy 10 is traveling at high speeds. The oscillation is of no substantial consequence if the controls for outboard motor 24 are mounted at bow 12 so that an operator sits at said bow. However, where the controls are not brought forward and the operator sits at the stern to control outboard motor 24, then the oscillation is noticeable and can create discomfort.

Figure 4:
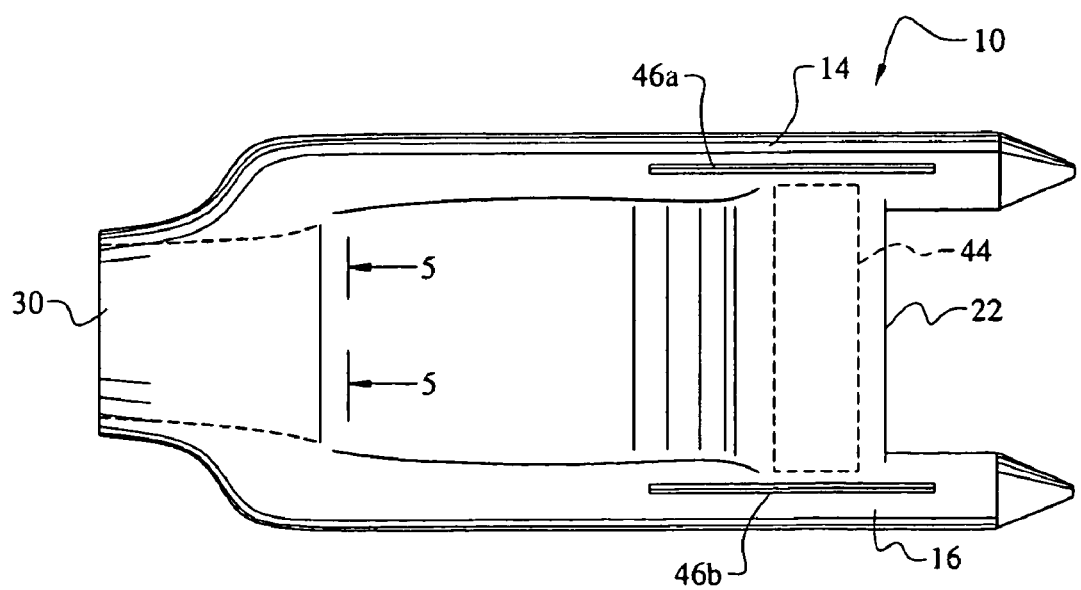
FIG. 4 is a bottom plan view of the novel dinghy.

This oscillation, also known as "fishtailing," is suppressed by mounting an elongate, longitudinally disposed, straight, flat rib 46a, 46b to the underside of the fiberglass coverings for each sidewall 14, 16, respectively, as depicted in FIG. 4. Each rib 46a, 48b 46b is perpendicular to the fiberglass covering from which it depends. The height of each rib is about two inches in this particular embodiment. The narrow transverse profile of each rib ensures that such ribs add only a nominal amount of drag.

When dinghy 10 traverses choppy waters, bow 12 periodically rises above the surface of the water to a height sufficient to enable air in rigid concavity 32 to flow in a reverse direction, i.e., toward air scoop 30. Such reverse flow prevents air from flowing into rigid concavity 32 and thus increases drag.

This problem is addressed and solved by positioning a one-way valve in air passageway 36. The one-way valve admits air into rigid concavity 32 but blocks reverse direction airflow. Accordingly, the reduced drag is maintained even in choppy waters.

The one-way valve may be provided in many forms, and all of those forms are within the scope of this invention because the art of one-way valves is well developed.

In a first embodiment of the one-way valve, a frame holding an open wire mesh screen 48 is fitted snugly within air passageway 36 as depicted in FIG. 5. Open wire mesh screen 48 is vertically disposed in said air passageway as perhaps best indicated in FIG. 1. It is preferably positioned near the trailing end of airflow passageway 36, just upstream of concavity 32. Such positioning enables it to be easily reached for maintenance purposes.

A plurality of flexible flaps, collectively denoted 50 in FIG. 5, is connected in depending relation to a top edge of the frame and overlies the trailing side thereof when in repose. Such flaps could also be secured to the top surface of air passageway 36, as long as they overlie the trailing side of the open wire mesh screen when in their respective positions of repose.

As depicted in FIG. 5, air flowing from air scoop 30 to concavity 32 thus flows through open mesh wire screen 48 and lifts flaps 50 therefrom. Only two (2) of the flaps are depicted in their lifted position to simplify the drawing. However, air attempting to flow in an opposite direction presses flaps 50 against open mesh wire screen 48. Flaps 50 are imperforate and thus such reverse-direction air cannot flow in said reverse direction. Since the air flowing into air scoop 30 does not encounter a reverse flow, it lifts flaps 50 and the reduced drag is not lost due to the momentary lifting of the bow from the water.

Where the water includes debris such as leaves and the like, wire mesh 48 may become clogged. Accordingly, said wire mesh 48 is eliminated in the alternative embodiment of FIG. 6. A frame that fits snugly in air passageway 36 includes a solid, imperforate gate 52 that is hingedly mounted to a top edge of said frame by hinges 52a and 52b so that said gate swings open, allowing air to flow from scoop 30 into rigid concavity 32 when bow 12 is in contact with the water, and said gate closes under its own weight to block reverse air flow from rigid concavity 32 to air scoop 30 when bow 12 is out of the water. The gate is in its position of repose when closed. This gate structure prevents air in rigid concavity 32 from flowing away from the stern so that the reduced drag provided by said air is not lost.

It should be noted that the pressure within rigid concavity increases whenever the flaps or gate is closed to prevent reverse flow of air and water.

It is advantageous to introduce some water into rigid concavity 32, however, so that the air within said rigid concavity is pushed toward stern 42 so that additional air may flow into said rigid concavity. This is accomplished by forming a plurality of notches, collectively denoted 60 in FIG. 7 and in FIGS. 8A, 8B in hull 34 where the trailing end of air passageway 36 meets the leading end of concavity 32. Water flowing toward stern 42 strikes said notches 60 and is broken up into a whitewater spray 61 that enters rigid concavity 32 and helps push air therein toward said stern.

Figure 9:
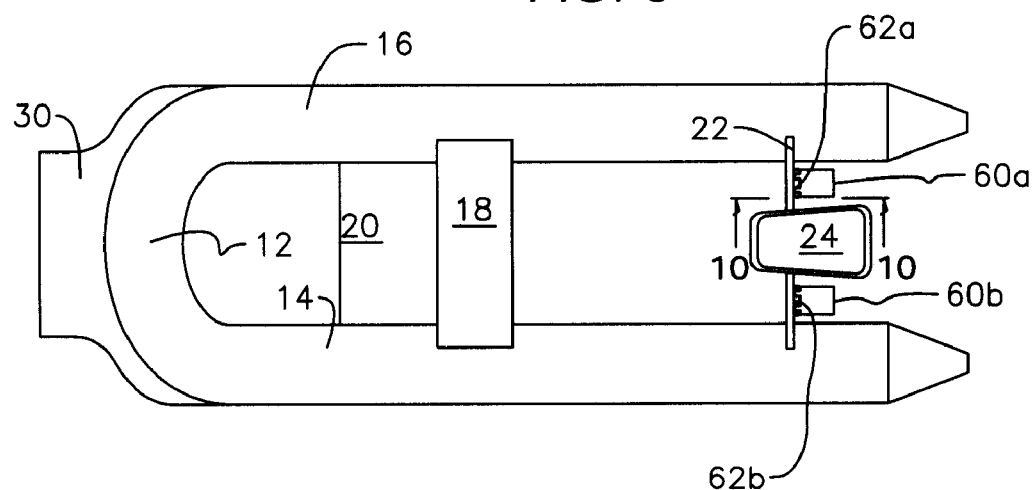
FIG. 9 is a top plan view of a second embodiment of the novel dinghy.
Figure 10:
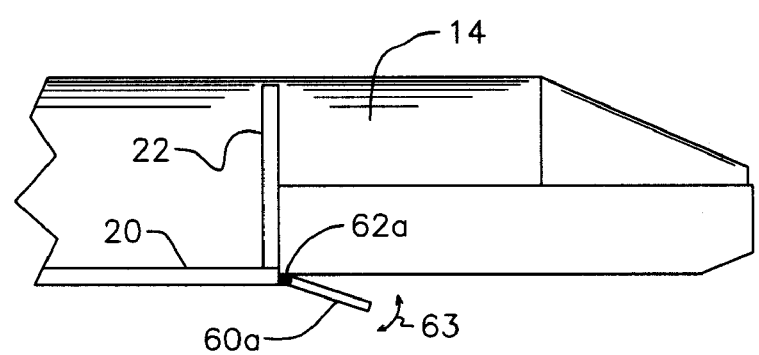
FIG. 10 is a sectional view taken along line 10—10 in FIG. 9.

FIGS. 9 and 10 depict a pair of pivotally mounted stern plates 60a, 60b that are pivotally mounted by hinges 62a, 62b to the lower end of transom 22, on opposite sides of motor 24. Suitable controls, not shown, are provided for controlling the instantaneous angular position of said stern plates relative to a horizontal plane, as indicated by double-headed directional arrow 63 in FIG. 9.

Increasing the downward tilt of the stern plates increases the back pressure in the rigid concavity.

When stern plates 60a, 60b are disposed at a slight angle such as one or two degrees (1°–2°), much like stern plate 44, little back pressure is provided and the buoyancy of the craft is reduced. As the angle of said stern plates is increased, the back pressure increases. This lifts the stern from the water to a greater extent than when the angle is less, thereby increasing the buoyancy of the craft.

The novel concept is not limited to dinghies. It may also be applied to RIBs (rigid inflatable boats), trimarans, surfboards, windsurfing boards, boogie boards, and the like.

Figure 11:
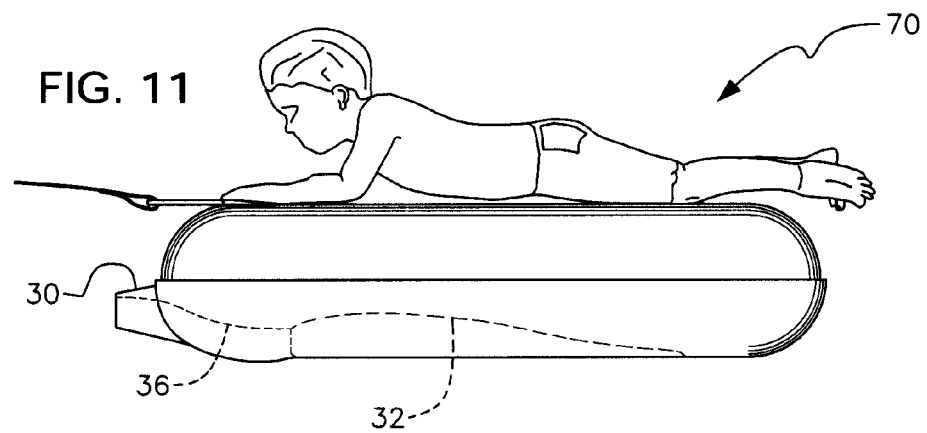
FIG. 11 is a side elevational view of an alternative small craft equipped with the novel air scoop and concavity.

For example, FIG. 11 depicts a fiberglass-coated inner tube 70 equipped with novel air scoop 30, rigid concavity 32, and air passageway 36. When towed, rigid concavity 32 greatly reduces the drag on water craft 70. As mentioned earlier, novel rigid concavity 32 reduces drag even if air scoop 30 is not provided.

Figure 12:
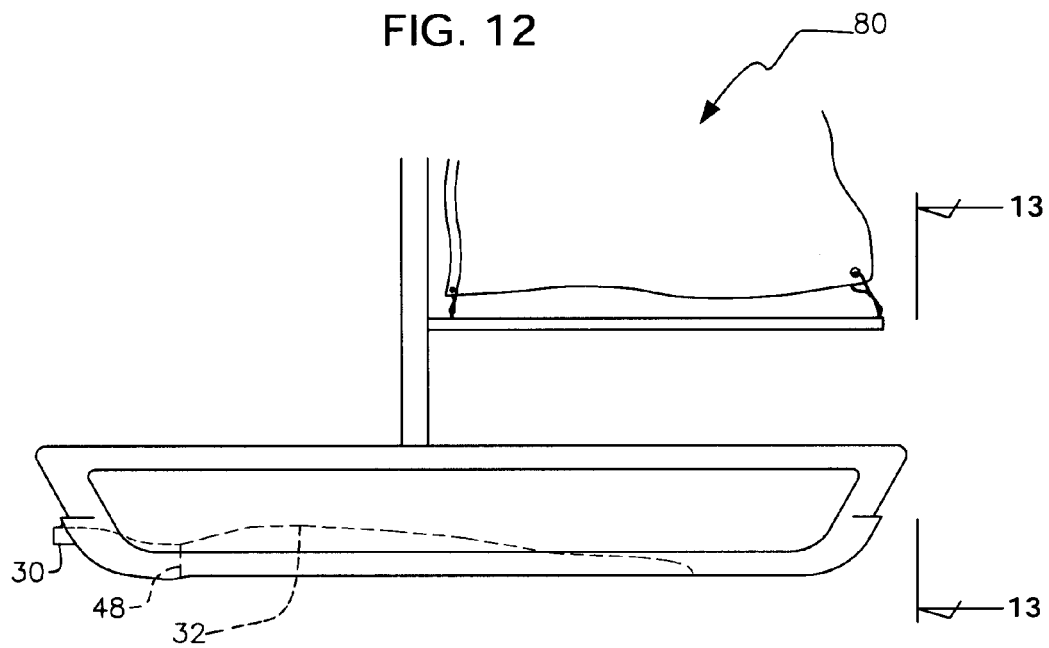
FIG. 12 is a side elevational view of a trimaran modified in accordance with the inventive teachings and suggestions.

FIG. 12 provides a side elevational view of a trimaran 80 equipped with air scoop 30 and rigid concavity 32. Again, novel concavity 32 reduces drag even if air scoop 30 is not provided.

Figure 13:
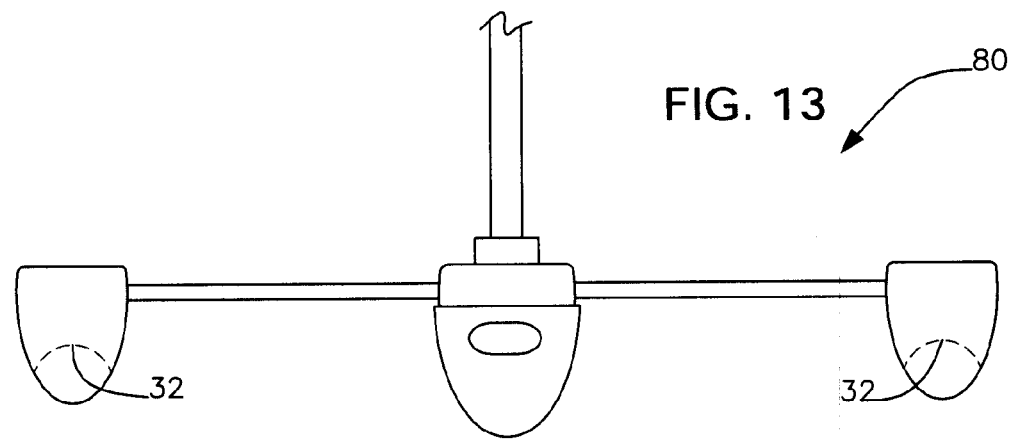
FIG. 13 is an end view taken along line 13—13 in FIG. 12.

FIG. 13 is an end view of trimaran 80. Novel concavity 32 is formed in the two outboard hulls but not in the central hull.

Figure 14:
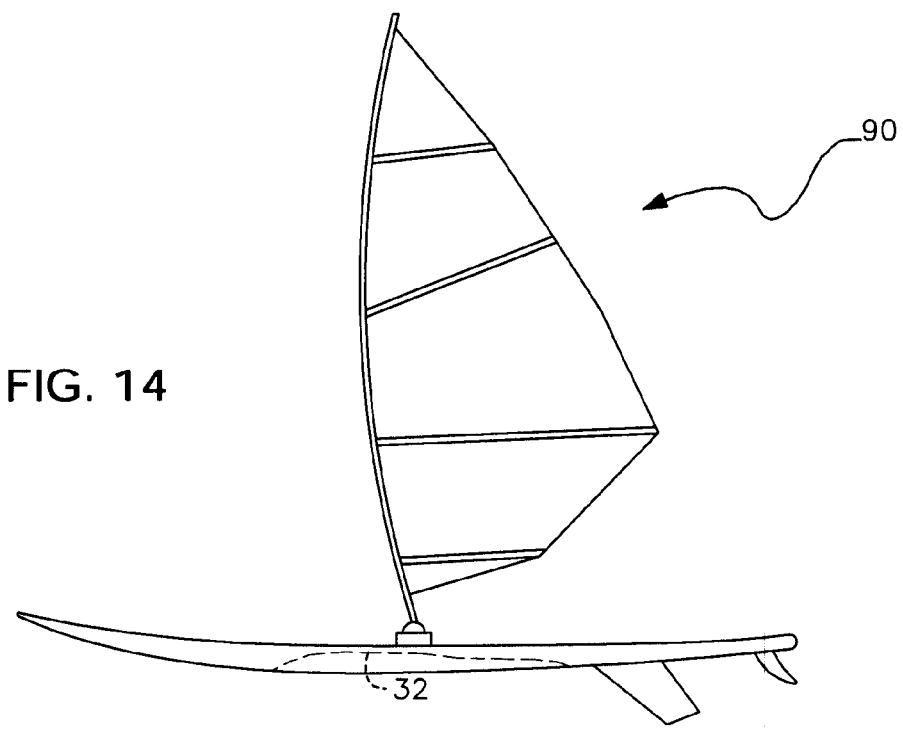
FIG. 14 is a side elevational view of a windsurfing board equipped with the novel concavity.

FIG. 14 is a side elevational view of a windsurfing board 90 equipped with novel concavity 32.

Figure 15:
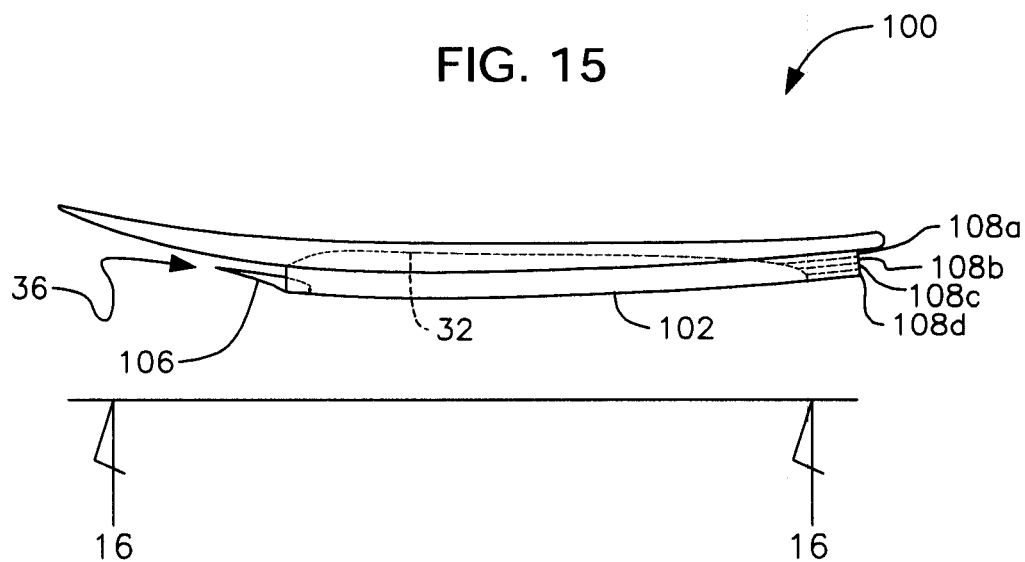
FIG. 15 is a side elevational view of a surfboard modified in accordance with the inventive teachings and suggestions.
Figure 16:
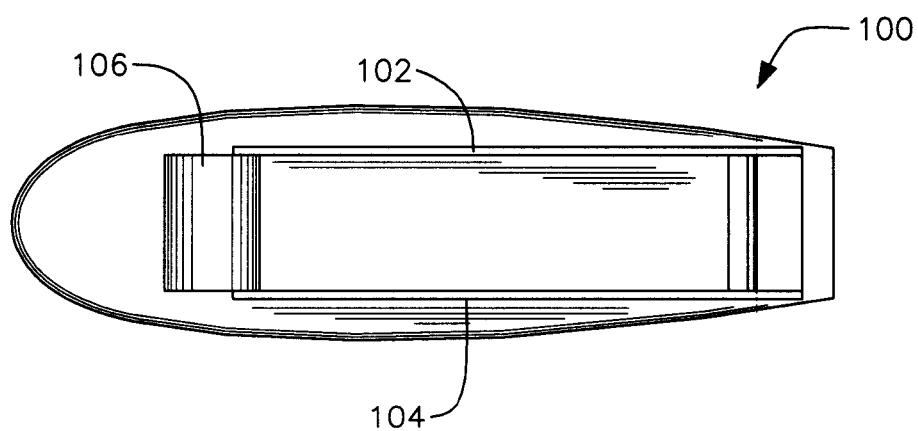
FIG. 16 is a bottom plan view taken along line 16—16 in FIG. 15.

FIGS. 15 and 16 depict a surfboard 100 or other small craft modified to enhance the effectiveness of concavity 32. A pair of longitudinally-extending rails 102, 104 form the side walls of concavity 32, thereby effectively increasing its depth. Bow plate 106 is positioned at the bow end of concavity 32 and creates air passageway 36 that directs ambient air into rigid concavity 32.

The stern of surfboard 100, or the stern of any other water craft made in accordance with the teachings and suggestions of this disclosure, is adaptable to varying loads. In FIG. 15, stern plate 108a is removably secured to the underside of surfboard 100 at the trailing end of rigid concavity 32. Stern plate 108b is removably secured to stern plate 108a, stern plate 108c is removably secured to stern plate 108b, and stern plate 108d is removably secured to stern plate 108c.

Moreover, the trailing end of each stern plate is flush with the trailing end of rails 102, 104. If the load on surfboard 100 is light, all stern plates are removed therefrom. If the load is heavier, stern plate 108a is secured into position. If the load is still heavier, stern plate 108b is removably secured to stern plate 108a. A heavier load requires the mounting of stern plate 108c to stern plate 108b and a still heavier load calls for mounting of stern plate 108d to 108c.

Whether one or more stern plates are added, dependent upon the load as aforesaid, the stern plate or plates operate much like stern plate 44 of the first embodiment.

Note that the leading end of each stern plate is curved to form the trailing end of rigid concavity 32 and that said curvature complements the curvature of the rigid concavity and of the other stern plates.

Air escaping from said rigid concavity must flow under said stern plate or plates in the form of bubbles.

It should be clear that this technology applies to any watercraft. A RIB (reinforced inflatable boat), for example, could be modified to have the novel concavity for use at relatively low speeds and to include air scoop 30 for higher speeds.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

We claim:

1. A water craft having reduced drag, comprising:
a bow, a pair of sidewalls disposed in trailing relation to opposite ends of said bow, a stern, a deck and a hull that collectively form said water craft;
a rigid concavity formed in said hull;
said rigid concavity having a longitudinal extent that exceeds a transverse extent thereof;
said rigid concavity having a forward end near said bow and a rearward end forwardly of said stern so that air flows into said rigid concavity at said forward end and so that air flows out of said rigid concavity at said rearward end and under said stern as said water craft undergoes forward travel;
an air scoop mounted on said bow, said air scoop adapted to collect ambient air when said water craft is undergoing forward travel and to direct said ambient air into said rigid concavity;
an airflow passageway that extends from a leading end of said air scoop into a leading end of said rigid concavity;
a one-way valve mounted in said airflow passageway to enable airflow into said rigid concavity when said water craft is in forward motion and to prevent reverse direction air flow so that air flowing in said airflow passageway toward said rigid concavity cannot flow in an opposite direction past said one-way valve;
whereby said air in said rigid concavity reduces the drag of the water craft, thereby enabling said water craft to travel faster under its own power and reducing the power required to tow the water craft behind a larger craft, because said air replaces water that would otherwise provide increased drag;

whereby water flowing under said water craft draws air into said airflow passageway and hence into said rigid concavity and whereby air in said rigid concavity does not flow toward said air scoop when the bow of the water craft is momentarily lifted from the water when the wate craft is traveling in choppy waters.

2. The water craft of claim 1, further comprising:

a frame for holding a vertically and transversely disposed wire mesh being snugly positioned in said airflow passageway;

a plurality of flexible flaps that depend from a top edge of said frame;

said flexible flaps being lifted from said wire mesh when air flows through said airflow passageway in a direction from said air scoop toward said rigid concavity;

said flexible flaps being pressed against said wire mesh when air flows from said rigid concavity toward said air scoop;

said flexible flaps in conjunction with said wire mesh forming said one-way valve.

3. The water craft of claim 1, further comprising:

a vertically and transversely disposed frame for an imperforate gate being snugly positioned in said airflow passageway;

said imperforate gate being hingedly connected to a top edge of said frame;

said imperforate gate being displaced from a position of repose when air flows through said airflow passageway in a direction from said air scoop toward said rigid concavity;

said imperforate gate returning to said position of repose when air flows from said rigid concavity toward said air scoop;

said imperforate gate forming said one-way valve.

4. The water craft of claim 1, further comprising:

a layer of rigid material that overlies said hull and a lower surface of said bow and sidewalls, said layer of rigid material imparting said rigidity to said rigid concavity and said layer of rigid material extending in integral form from said concavity to respective lower surface of said bow and sidewalls;

an elongate, longitudinally disposed rib secured to an underside of each of said sidewalls in depending relation thereto;

said elongate ribs inhibiting transverse motion of said stern when said water craft is in forward motion.

5. The water craft of claim 1, further comprising:

said air scoop having a generally elliptical shape such that a transverse extent thereof is greater than a height extent thereof.

6. The water craft of claim 1, further comprising:

a rigid, transversely disposed stern plate mounted to an underside of said hull;

said stern plate being positioned forwardly of said stern;

said stern plate being angled by a small angle relative to a horizontal plane such that a leading end thereof is slightly elevated relative to a trailing end thereof.

7. The stern plate of claim 6, further comprising:

said small angle being about one to two degrees (1–2°) relative to said horizontal plane.

8. The water craft of claim 1, further comprising:

a pair of stern plates hingedly mounted to said water craft at the stern thereof on opposite sides of a motor;

control means for varying the angle of said stern plates relative to a horizontal plane;

whereby back pressure to air and water flow through said rigid concavity is controlled by controlling the angle of said stern plates, there being reduced back pressure when said stern plates are disposed at a relatively small angle relative to a horizontal plane and there being increased back pressure when said stern plates are disposed at a relatively large angle relative to said horizontal plane;

whereby increased back pressure provides increased buoyancy for the water craft.

* * * * *